United States Patent
Lu et al.

(10) Patent No.: US 12,512,455 B2
(45) Date of Patent: Dec. 30, 2025

(54) CONTINUOUS, SOLVENT-FREE FABRICATION OF ELECTRODES USING DRY POWDER

(71) Applicant: GM GLOBAL TECHNOLOGY OPERATIONS LLC, Detroit, MI (US)

(72) Inventors: Yong Lu, Shanghai (CN); Meiyuan Wu, Shanghai (CN); Ming Wang, Sterling Heights, MI (US); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/590,165

(22) Filed: Feb. 28, 2024

(65) Prior Publication Data

US 2025/0226380 A1    Jul. 10, 2025

(30) Foreign Application Priority Data

Jan. 10, 2024 (CN) .......................... 202410040955.3

(51) Int. Cl.
*H01M 4/04* (2006.01)
*H01M 4/62* (2006.01)

(52) U.S. Cl.
CPC ....... *H01M 4/0435* (2013.01); *H01M 4/0404* (2013.01); *H01M 4/623* (2013.01)

(58) Field of Classification Search
CPC .. H01M 4/0404; H01M 4/0435; H01M 4/623; Y02E 60/10
USPC ........................................................ 156/582
See application file for complete search history.

(56) References Cited

U.S. PATENT DOCUMENTS

2021/0320288 A1* 10/2021 Althues ................. H01G 11/28

FOREIGN PATENT DOCUMENTS

| DE | 102017218158 A1 | 4/2019 |
| DE | 102022118608 A1 | 7/2023 |
| DE | 102022106527 A1 | 9/2023 |

OTHER PUBLICATIONS

German Office Action from counterpart DE1020241052112, dated Nov. 15, 2024.

\* cited by examiner

*Primary Examiner* — James D Sells

(57) ABSTRACT

A manufacturing system for an electrode of a battery cell includes a conveyor belt configured to receive a fiberized powder mixture including an active material, a conductive additive, and a binder. A powder dispensing stage is arranged adjacent to the conveyor belt and configured to dispense the fiberized powder mixture. A pre-forming stage is arranged adjacent to the conveyor belt and configured to receive the fiberized powder mixture dispensed by the powder dispensing stage and to press the fiberized powder mixture into a raw active material layer. N calendaring rollers configured to receive the raw active material layer from the conveyor belt and to calendar the raw active material layer to form an active material layer, where N is an integer greater than one. A pair of laminating rollers is configured to laminate the active material layer to a current collector to form an electrode.

11 Claims, 5 Drawing Sheets

CONTINUOUS, SOLVENT-FREE FABRICATION OF ELECTRODES USING DRY POWDER

CROSS-REFERENCE TO RELATED APPLICATIONS

This application claims the benefit of Chinese Patent Application No. 202410040955.3, filed on Jan. 10, 2024. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to the manufacturing of electrodes of battery cells.

Electric vehicles (EVs) such as battery electric vehicles (BEVs), hybrid vehicles, and/or fuel cell vehicles include one or more electric machines and a battery system including one or more battery cells, modules, and/or packs. A power control system is used to control charging and/or discharging of the battery system during charging and/or driving.

Battery cells include cathode electrodes, anode electrodes, and separators. The cathode electrodes include a cathode active material layer (including cathode active material) arranged on a cathode current collector. The anode electrodes include an anode active material layer (including anode active material) arranged on an anode current collector.

SUMMARY

A manufacturing system for an electrode of a battery cell includes a conveyor belt configured to receive a fiberized powder mixture including an active material, a conductive additive, and a binder. A powder dispensing stage is arranged adjacent to the conveyor belt and configured to dispense the fiberized powder mixture. A pre-forming stage is arranged adjacent to the conveyor belt and configured to receive the fiberized powder mixture dispensed by the powder dispensing stage and to press the fiberized powder mixture into a raw active material layer. N calendaring rollers configured to receive the raw active material layer from the conveyor belt and to calendar the raw active material layer to form an active material layer, where N is an integer greater than one. A pair of laminating rollers is configured to laminate the active material layer to a current collector to form an electrode.

In other features, the binder comprises polytetrafluoroethylene (PTFE). The powder dispensing stage includes a blade defining a predetermined gap relative to an upper surface of the conveyor belt and a vibrator to vibrate the blade. The vibrator vibrates the blade at an ultrasonic frequency. The powder dispensing stage includes a chopping plate and an actuator configured to reciprocally move the chopping plate into the fiberized powder mixture on the conveyor belt. The actuator moves the chopping plate at a frequency greater than 200 Hz.

In other features, the pre-forming stage includes a roller configured to press the fiberized powder mixture against the conveyor belt to form the raw active material layer. The roller at least one of rotates, oscillates, vibrates. The roller is constructed from a metal selected from a group consisting of stainless steel, tungsten carbide, an alloy, polyurethane, silicone rubber, polytetrafluoroethylene, and a polymer composite. A surface of the roller includes a coating material selected from a group consisting of chrome, tungsten carbide, alumina, zirconia, and diamond-like carbon.

In other features, the pre-forming stage includes a packing plate and an actuator configured to reciprocally move the packing plate against the fiberized powder mixture on the conveyor belt to form the raw active material layer.

A method for manufacturing an electrode of a battery cell includes mixing an active material, a conductive additive, and a binder to form a fiberized powder mixture; delivering the fiberized powder mixture onto a conveyor belt; dispensing the fiberized powder mixture; pressing the fiberized powder mixture on the conveyor belt into a raw active material layer; receiving the raw active material layer from the conveyor belt and calendaring the raw active material layer using N rollers to form an active material layer, where N is an integer greater than one; and laminating the active material layer to a current collector to form an electrode.

In other features, the binder comprises polytetrafluoroethylene (PTFE). The method includes dispensing the fiberized powder mixture includes using a vibrating blade defining a predetermined gap relative to an upper surface of the conveyor belt. The method includes vibrating the vibrating blade at an ultrasonic frequency. The method includes dispensing the fiberized powder mixture includes using a chopping plate. The method includes moving the chopping plate at a frequency greater than 200 Hz.

In other features, the method includes pressing the fiberized powder mixture into the raw active material layer includes using a roller to press the fiberized powder mixture against the conveyor belt. The roller is constructed from a metal selected from a group consisting of stainless steel, tungsten carbide, an alloy, polyurethane, silicone rubber, polytetrafluoroethylene, and a polymer composite. A surface of the roller includes a coating material selected from a group consisting of chrome, tungsten carbide, alumina, zirconia, and diamond-like carbon.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While battery cells according to the present disclosure are described in the context of vehicles, the battery cells can be used in other applications such as stationary applications.

Electrodes include an active material layer that is cast or laminated onto a current collector. The active material layer includes an active material, a conductive additive, and a binder. In some processes, the active material, the conductive additive, and the binder are combined with solvent and cast onto the current collector. Then, the active material layer passes through an oven to remove the solvent.

A solvent-free electrode fabrication process according to the present disclosure eliminates the use of solvent and the requirement for a drying stage to remove the solvent. Elimination of the drying stage reduces a manufacturing footprint. Elimination of the solvent reduces the environmental impact. The solvent-free electrode fabrication process use a binder such as polytetrafluoroethylene (PTFE) that is mixed with the active material and the conductive additive. The binder is fibrillated to bind the active material layer together. High shear force mixing is performed to provide a fiberized powder mixture including the active material, the conductive additive, and the binder (e.g., PTFE fibrils). However, continuous calendaring of the fiberized mixture into a uniform electrode is challenging.

The present disclosure relates to systems and methods that continuously calendar a fiberized powder mixture for electrodes into uniform electrodes using a solvent-free fabrication process. The systems and methods include using a powder dispensing stage and a pre-forming stage to enhance scalability. In some examples, the powder dispensing stage includes an ultrasonic vibration plate or a high-speed chopping tool to dispense the fiberized powder mixture.

The electrode pre-forming stage outputs the active material layer as a raw, thick active material layer to a set of rollers for calendaring. Then, the active material layer is laminated with the current collector to form an electrode. In some examples, the electrode pre-forming stage includes a roller or a press plate to press the fiberized powder mixture into the raw, thick active material layer. The powder dispensing stage and the electrode pre-forming stage improve the manufacturability and uniformity of the free-standing electrodes as compared to processes attempting to directly calendar the dry powders without dispensing or pre-forming.

Figure 1:
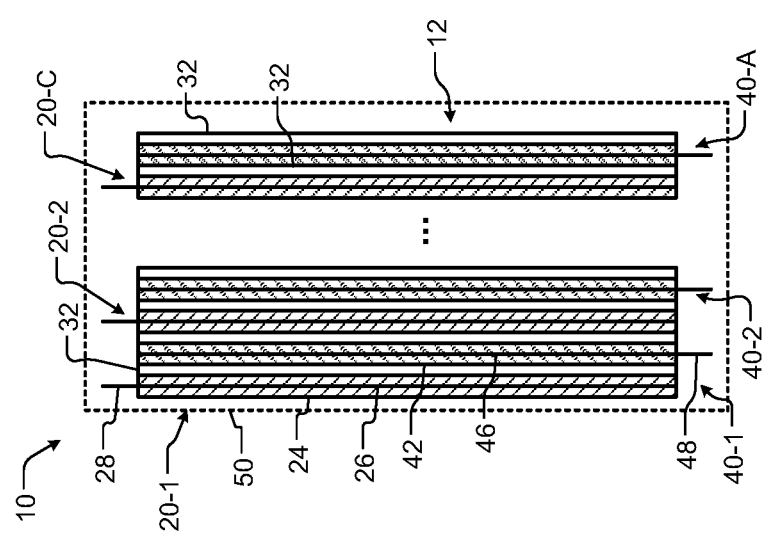
FIG. 1 is a side cross sectional view of an example of a battery cell including cathode electrodes, anode electrodes, and separators according to the present disclosure.

Referring now to FIG. 1, a battery cell 10 includes C cathode electrodes 20, A anode electrodes 40, and S separators 32 arranged in a predetermined sequence in a battery cell stack 12, where C, S and A are integers greater than zero. The battery cell stack 12 is arranged in an enclosure 50. The C cathode electrodes 20-1, 20-2, . . . , and 20-C include cathode active material layers 24 arranged on one or both sides of a cathode current collector 26.

In some examples, the A anode electrodes 40 and the C cathode electrodes 20 exchange lithium ions during charging/discharging. The A anode electrodes 40-1, 40-2, . . . , and 40-A include anode active material layers 42 arranged on one or both sides of the anode current collectors 46. In some examples, the cathode active material layers 24 and/or the anode active material layers 42 comprise self-standing film including one or more active materials, one or more conductive additives, and/or one or more binder materials that formed using a solvent-free dry process and then laminated to the current collectors.

In some examples, the cathode current collector 26 and/or the anode current collector 46 comprise metal foil, metal mesh, perforated metal, 3 dimensional (3D) metal foam, and/or expanded metal. In some examples, the current collectors are made of one or more materials selected from a group consisting of copper, stainless steel, brass, bronze, zinc, aluminum, and/or alloys thereof. External tabs 28 and 48 are connected to the current collectors of the cathode electrodes and anode electrodes, respectively, and can be arranged on the same or different sides of the battery cell stack 12. The external tabs 28 and 48 are connected to terminals of the battery cells.

Figure 2:
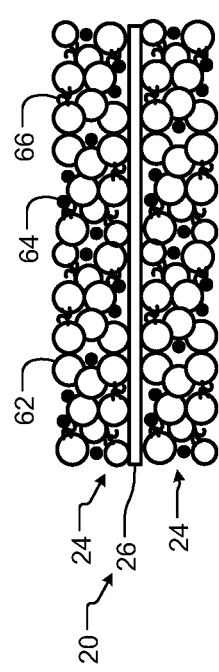
FIG. 2 is a side cross sectional view of an example of a cathode electrode according to the present disclosure.
Figure 3:
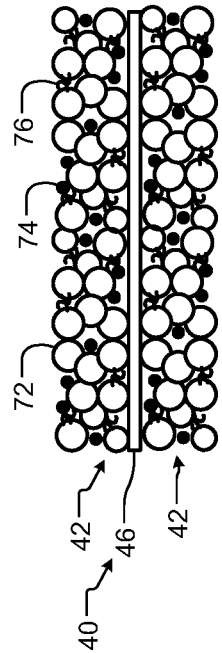
FIG. 3 is a side cross sectional view of an example of an anode electrode according to the present disclosure.

Referring now to FIGS. 2 and 3, examples of cathode electrodes and anode electrodes are shown. In FIG. 2, one of the C cathode electrode 20 is shown in further detail. The cathode active material layer 24 includes cathode active material 62, a conductive additive 64, and a binder 66 (e.g., PTFE). In FIG. 3, the anode electrode 40 is shown in further detail. The anode active material layer 42 of the anode electrode 40 includes anode active material 72, a conductive additive 74, and a binder 76 (e.g., PTFE).

Figure 4:
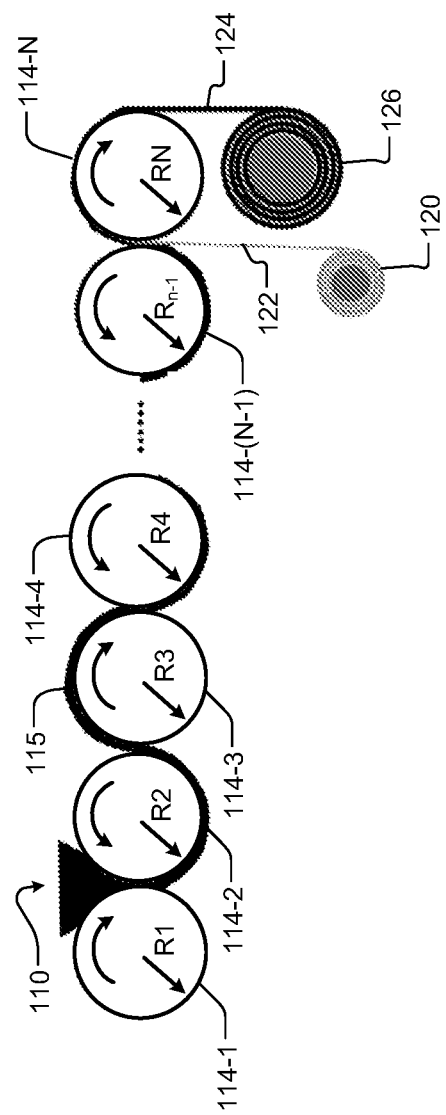
FIG. 4 illustrates an example of a roll-to-roll manufacturing process for an electrode.

Referring now to FIG. 4, a dry powder mixture for the active material layer is typically delivered between rollers 114-1 and 114-2 in a roll-to-roll manufacturing process for manufacturing an electrode. The dry powder mixture is pressed between rollers 114-2, 114-3, . . . , and 114-N to calendar the active material layer. Rollers 114-N−1 and 114-N laminate the calendared active material layer to a current collector 122 delivered by a roll 120. The electrode 124 is collected on a roll 126.

It is difficult to uniformly dispense dry powder mixtures including electrode active materials, conductive additives, and binders (such as PTFE) between the rollers 114-1 and 114-2. Some of the dry powder mixture passes through the gap between the rollers 114-1 and 114-2 without sufficient pressing. The areas with more dry powder mixture may be over-pressed. Large doughy mixtures are hard to calendar due to slippery surfaces. In summary, it is hard to manufacture uniform electrodes using the current dry fabrication process.

Figure 5:
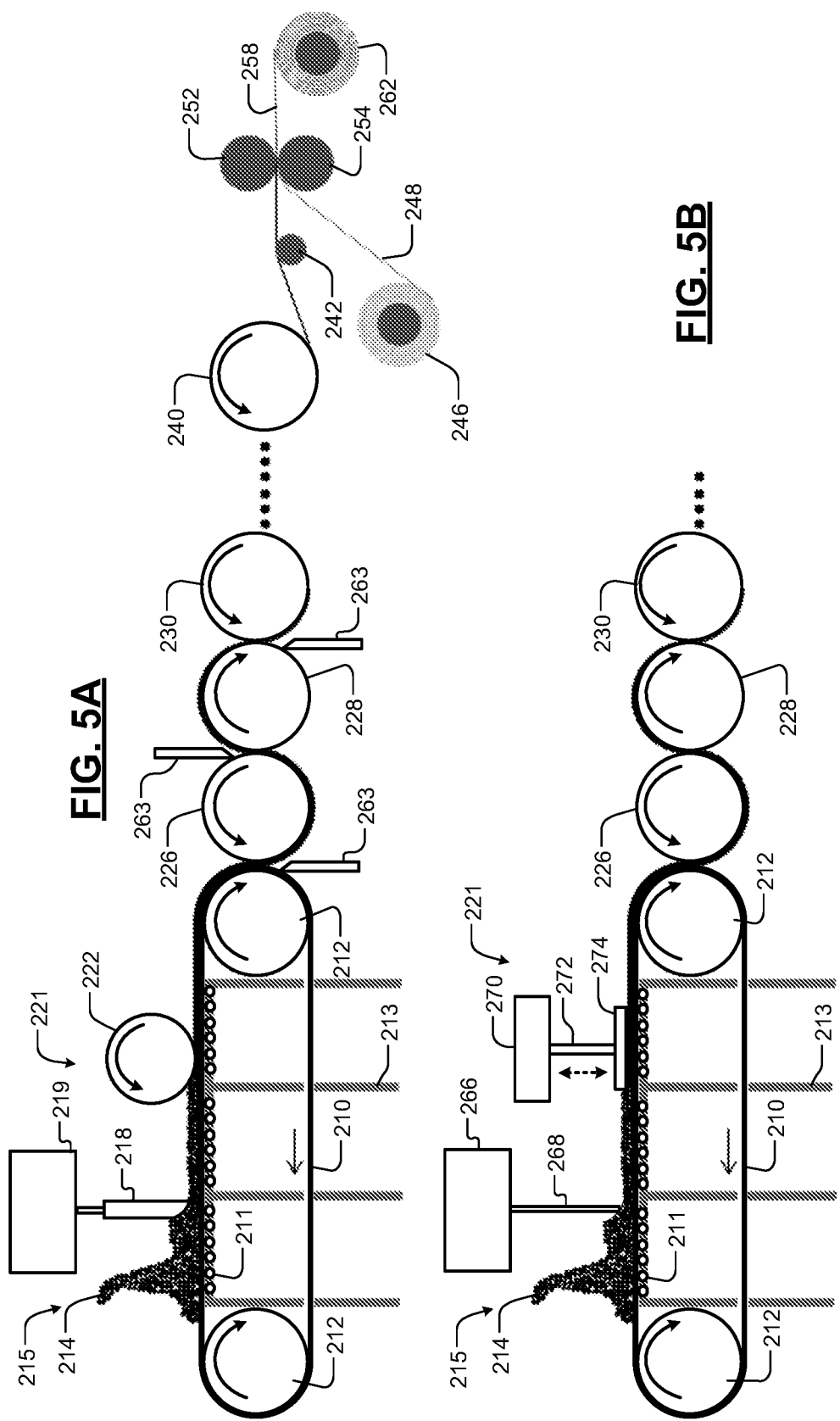
FIG. 5A is a side cross sectional view of an example of a roll-to-roll manufacturing process for an electrode according to the present disclosure.
FIG. 5B is a side cross sectional view of another example of a roll-to-roll manufacturing process for an electrode according to the present disclosure.

Referring now to FIGS. 5A and 5B, a fiberized powder mixture 214 is produced by dry mixing an active material, a conductive additive, and a binder (such as PTFE). Then, the fiberized powder mixture 214 is uniformly dispensed by a powder dispensing stage 215. The dispensed fiberized powder mixture 214 is delivered to a pre-forming stage 221 that presses the fiberized powder mixture 214 into a raw, thick active material layer. In some examples, the raw, thick active material layer has a thickness between 500 um to 3 mm. The raw, thick active material layer is calendared into the active material layer and laminated to the current collector to form the electrode.

In some examples, the roll-to-roll equipment includes a conveyor belt 210 driven by rollers 212 and/or supported on rollers 211 mounted to a rigid frame 213. The fiberized powder mixture 214 is delivered onto the conveyor belt 210 upstream from the powder dispensing stage 215. The conveyor belt 210 transports the fiberized powder mixture 214 to the powder dispensing stage 215. In some examples, the powder dispensing stage 215 includes a blade 218. The blade 218 defines a gap between the bottom edge of the blade 218 and an upper surface of the conveyor belt 210. In some examples, the blade 218 is connected to an ultrasonic vibrator 219.

In some examples, the pre-forming stage 221 includes a roller 222 defining a gap relative to the conveyor belt 210. The conveyor belt 210 presses the active material layer against the conveyor belt 210 to form a raw, thick active material layer. In some examples, the roller 222 is heated to a temperature in a range from 80° C. to 200° C. In some examples, the roller 222 can be a hot roller, an oscillating roller, a vibrating roller, or a combination thereof. In some examples, rollers can be constructed from various metals, including stainless steel, tungsten carbide, or different alloys. The roller surface can range from smooth to rough and may receive a coating to enhance durability. Coating materials include chrome, tungsten carbide, boron nitride, alumina, zirconia, and diamond-like carbon, among others. In some examples, the roller can be constructed from various polymers including polyurethane, silicone rubber, polytetrafluoroethylene, or other polymer composites.

After passing through the pre-forming stage 221, the raw, thick active material layer is fed by the conveyor belt 210 between the rollers 212 and 226 and around/between adjacent rollers 228, 230, . . . , and 240 to calendar the active material layer. In some examples, the rollers 212, 226, 228, 230, . . . , and/or 240 are heated to a temperature in a range from 80° C. to 200° C. In some examples, successively smaller gaps are defined between adjacent pairs of the rollers.

After calendaring, the active material layer is fed over one or more guide rollers 242 between a pair of laminating rollers 252 and 254. A current collector 248 is supplied by a roll 246 between the pair of laminating rollers 252 and 254. The calendared active material layer and the current collector are laminated to form an electrode 258 that is collected onto a roll 262. In some examples, one or more blades 263 are used to direct or bias the active material layer from one roller to another.

In FIG. 5B, other examples of the powder dispensing stage 215 and/or the pre-forming stage 221 are shown. The powder dispensing stage 215 includes an actuator 266 that moves a chopping plate 268 reciprocally relative to the upper surface of the conveyor belt 210 to dispense the fiberized powder mixture 214. In some examples, the frequency of the chopping plate 268 is greater than 200 Hz.

The pre-forming stage 221 includes an actuator 266 that reciprocally moves a packing plate 272 against the active material layer. The packing plate 272 includes a shaft connected to a plate arranged parallel to the upper surface of the conveyor belt 210. The packing plate 272 presses the fiberized powder mixture 214 against the conveyor belt 210 to form the raw, thick active material layer. As can be appreciated, the powder dispensing stage 215 and/or the pre-forming stage 221 of FIGS. 5A and 5B are interchangeable. As a result of the dispensing and pre-forming, the active material layer is more suitable for the calendaring rollers that follow.

Figure 6:
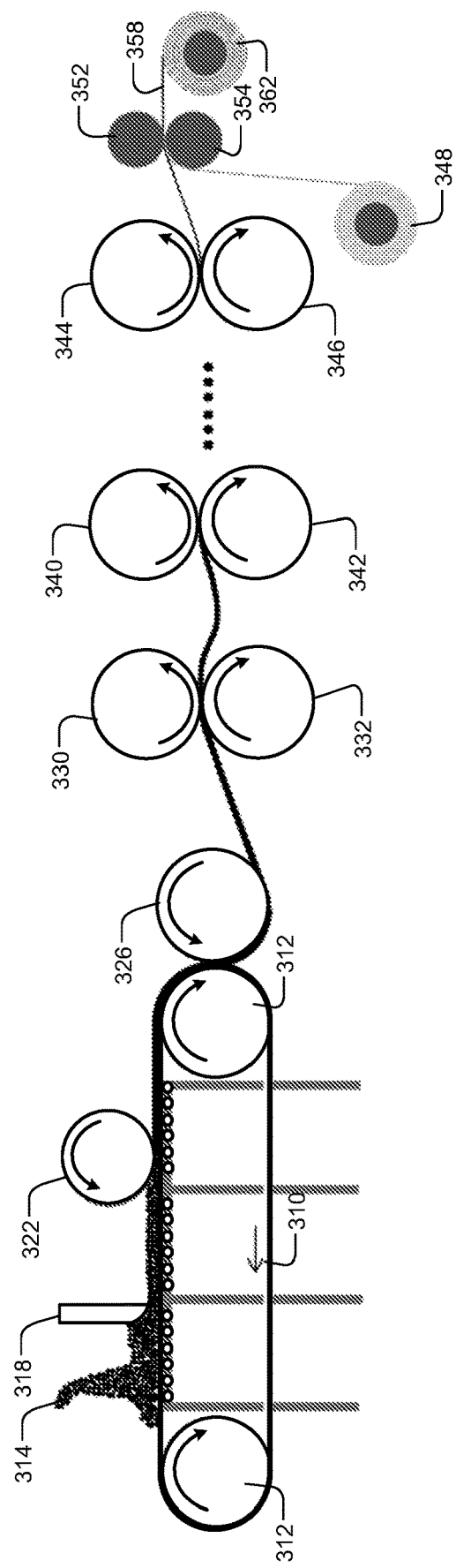
FIG. 6 is a side cross sectional view of another example of a roll-to-roll manufacturing process for an electrode according to the present disclosure.

Referring now to FIG. 6, a fiberized powder mixture 314 is supplied to a powder dispensing stage 315 that dispenses the fiberized powder mixture 314. The dispensed, fiberized powder mixture is output to a pre-forming stage 321 that presses the fiberized powder mixture 314 into a raw, thick active material layer. The raw, thick active material layer is calendared and laminated to a current collector to form an electrode.

For example, a conveyor belt 310 is driven by rollers 312 mounted to a rigid frame 313. The fiberized powder mixture 314 is delivered onto the conveyor belt 310 upstream from the powder dispensing stage 315. The powder dispensing stage 315 includes a blade 318 (or a chopping plate) to uniformly dispense the fiberized powder mixture 314. The pre-forming stage 321 includes a roller 322 (or a packing plate) that presses (and/or heats) the fiberized powder mixture 314 to form the raw, thick active material layer. The conveyor belt 310 feeds the active material layer between rollers 312 and 326 and around/between rollers 330 and 332, 340 and 342, . . . , and 344 and 346 (defining successively smaller gaps) to calendar the active material layer. After calendaring, the active material layer is fed between a pair of laminating rollers 352 and 354. A current collector 348 from a roll 346 is fed between the pair of laminating rollers 352 and 354. The active material layer and the current collector are laminated into an electrode that is collected onto a roll 362.

Figure 7:
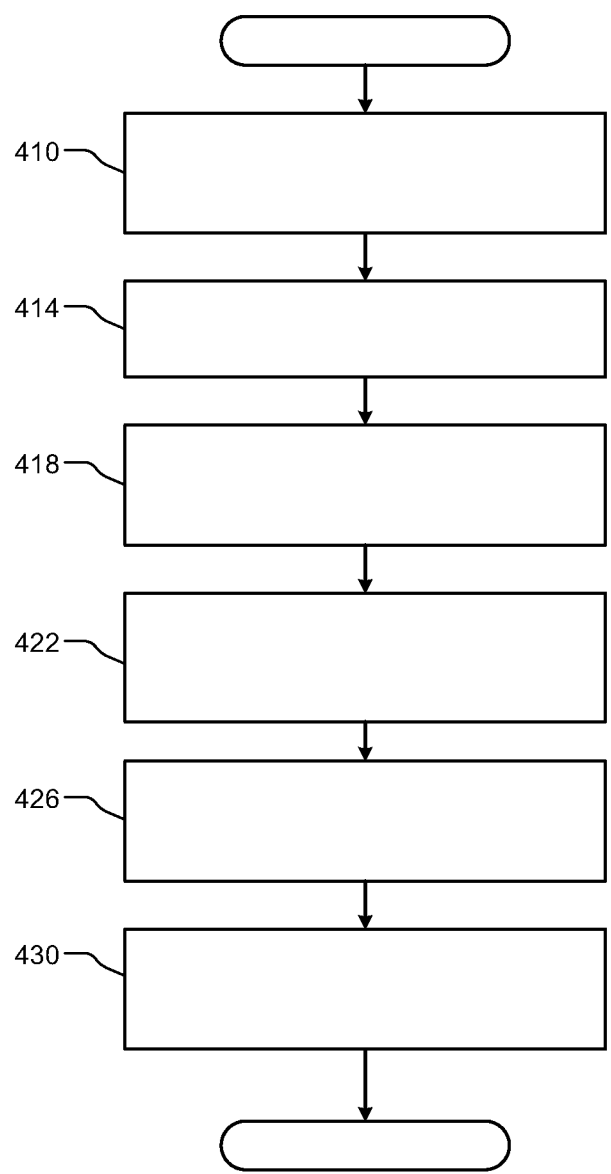
FIG. 7 is a flowchart of an example of a method for manufacturing an electrode according to the present disclosure.

Referring now to FIG. 7, a method for manufacturing an electrode is shown. At 410, materials of the active material layer (the active material, the conductive additive, and the binder) are mixed and fibrillated to form the fiberized powder mixture. At 414, the fiberized powder mixture is delivered onto a conveyor belt. At 418, a powder dispensing stage is used to uniformly dispense the fiberized powder mixture. At 422, the uniformly dispensed fiberized powder mixture is pre-formed by a pre-forming stage into a raw, thick active material layer. At 426, the raw, thick active material layer is calendared. At 430, the active material layer is laminated with a current collector to form an electrode.

In some examples, the roller at least one of rotates, oscillates, vibrates. In some examples, the roller is constructed from a metal selected from a group consisting of stainless steel, tungsten carbide, an alloy, polyurethane, silicone rubber, polytetrafluoroethylene, and a polymer composite. In some examples, the surface of the roller includes a coating material selected from a group consisting of chrome, tungsten carbide, alumina, zirconia, and diamond-like carbon.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A manufacturing system for an electrode of a battery cell, comprising:
    a conveyor belt configured to receive a fiberized powder mixture including an active material, a conductive additive, and a binder;
    a powder dispensing stage arranged adjacent to the conveyor belt and configured to dispense the fiberized powder mixture;
    a pre-forming stage arranged adjacent to the conveyor belt and configured to receive the fiberized powder mixture dispensed by the powder dispensing stage and to press the fiberized powder mixture into a raw active material layer;
    N calendaring rollers configured to receive the raw active material layer from the conveyor belt and to calendar the raw active material layer to form an active material layer, where N is an integer greater than one; and
    a pair of laminating rollers configured to laminate the active material layer to a current collector to form an electrode.

2. The manufacturing system of claim 1, wherein the binder comprises polytetrafluoroethylene (PTFE).

3. The manufacturing system of claim 1, wherein the powder dispensing stage includes a blade defining a predetermined gap relative to an upper surface of the conveyor belt and a vibrator to vibrate the blade.

4. The manufacturing system of claim 3, wherein the vibrator vibrates the blade at an ultrasonic frequency.

5. The manufacturing system of claim 1, wherein the powder dispensing stage includes a chopping plate and an actuator configured to reciprocally move the chopping plate into the fiberized powder mixture on the conveyor belt.

6. The manufacturing system of claim 5, wherein the actuator moves the chopping plate at a frequency greater than 200 Hz.

7. The manufacturing system of claim 1, wherein the pre-forming stage includes a roller configured to press the fiberized powder mixture against the conveyor belt to form the raw active material layer.

8. The manufacturing system of claim 7, wherein the roller at least one of rotates, oscillates, vibrates.

9. The manufacturing system of claim 7, wherein the roller is constructed from a metal selected from a group consisting of stainless steel, tungsten carbide, an alloy, polyurethane, silicone rubber, polytetrafluoroethylene, and a polymer composite.

10. The manufacturing system of claim 9, wherein a surface of the roller includes a coating material selected from a group consisting of chrome, tungsten carbide, alumina, zirconia, and diamond-like carbon.

11. The manufacturing system of claim 1, wherein the pre-forming stage includes a packing plate and an actuator configured to reciprocally move the packing plate against the fiberized powder mixture on the conveyor belt to form the raw active material layer.

* * * * *